United States Patent
Olrog (10) Patent No.: US 9,350,766 B2
(45) Date of Patent: May 24, 2016

(54) CONNECTING A PBX TO AN IMS-NETWORK (75) Inventor: Christian Olrog, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 113 days.

(21) Appl. No.: 14/127,689

(22) PCT Filed: Jun. 20, 2011

(86) PCT No.: PCT/SE2011/050782
§ 371 (c)(1),
(2), (4) Date: Dec. 19, 2013

(87) PCT Pub. No.: WO2012/177188
PCT Pub. Date: Dec. 27, 2012

(65) Prior Publication Data
US 2014/0126570 A1 May 8, 2014

(51) Int. Cl.
H04L 29/06 (2006.01)
H04L 12/66 (2006.01)

(52) U.S. Cl.
CPC .......... *H04L 65/1053* (2013.01); *H04L 65/103* (2013.01); *H04L 65/1006* (2013.01); *H04L 65/1036* (2013.01); *H04L 65/1069* (2013.01); *H04L 65/1073* (2013.01)

(58) Field of Classification Search
CPC .................................................. H04L 65/1006
USPC ......................................................... 370/352
See application file for complete search history.

(56) References Cited

U.S. PATENT DOCUMENTS

| 7,441,045 | B2 * | 10/2008 | Skene et al. ................... 709/241 |
| 2002/0104017 | A1 * | 8/2002 | Stefan ................. H04L 63/0209 726/13 |
| 2003/0093462 | A1 * | 5/2003 | Koskelainen et al. ........ 709/203 |

OTHER PUBLICATIONS

"Storing", Merriam-Webster, http://www.merriam-webster.com/dictionary/storing, accessed Feb. 20, 2010, via The Wayback Machine, https://archive.org/, accessed Oct. 7, 2015.*
"Internet socket", Wikipedia.org, http://en.wikipedia.org/wiki/Network_socket, accessed Mar. 19, 2008, via The Wayback Machine, https://archive.org/, accessed Oct. 7, 2015.*
"Dynamic update", Microsoft|TechNet, http://technet.microsoft.com/en-us/library/cc784052(v=WS.10).aspx, accessed Jun. 7, 2011, via The Wayback Machine, https://archive.org/, accessed Oct. 7, 2015.*

(Continued)

*Primary Examiner* — Melanie Jagannathan
*Assistant Examiner* — Thomas R Cairns
(74) *Attorney, Agent, or Firm* — Patent Portfolio Builders, PLLC (57) ABSTRACT A border gateway (2) and a SIP Application Server (8) in an IMS network (3), which both are configured to connect a private branch exchange (1) to the IMS network using the SIP Connect. The connecting comprises the border gateway detecting, based on an address contained in a received SIP register message, that the SIP register message is received from a private branch exchange. Then, the border gateway forwards the received message to the SIP Application Server as a SIP connect-message from a private branch exchange, and the SIP Application server stores a binding server between an IP address of the private branch exchange and the received address associated with the private branch exchange, e.g. by dynamically updating an eDNS (6).

6 Claims, 7 Drawing Sheets (56) References Cited

OTHER PUBLICATIONS

"Understanding forwarders", Microsoft|TechNet, http://technet.microsoft.com/en-us/library/cc782142(v=WS.10).aspx, accessed Jun. 11, 2011 via The Wayback Machine, https://archive.org/, accessed Oct. 7, 2015.*

Dawkins, S. "SIP-PBX / Service Provider Interoperability." SIPconnect 1.1 Technical Recommendation. SIP Forum Document No. TWG-2. 2011.

Unknown, Author. "PacketCable." Enterprise SIP Gateway Specification. PKT-SP-ESG-I01-101103. Cable Television Laboratories, Inc. 2010.

Rosenberg et al. "An Extension to the Session Initiation Protocol (SIP) for Symmetric Response Routing." Network Working Group. Request for Comments: 3581. The Internet Society. Aug. 2003.

Sibley et al. "IP PBX / Service Provider Interoperability." SIPconnect 1.0 Technical Recommendation. SIP Forum. 2008.

* cited by examiner

Border Gateway:

CONNECTING A PBX TO AN IMS-NETWORK

TECHNICAL FIELD

The present invention relates to a method for a border gateway of an IMS network, e.g. an SBG (Session Border Gateway) or a BGC (Border Gateway Controller), and for a SIP Application Server of the IMS network, of connecting a private branch exchange to the IMS network. The invention also relates to a border gateway and a SIP Application server, which are connectable to an IMS network, and to an IMS network comprising the border gateway and the SIP Application Server.

BACKGROUND

The IMS (Internet Protocol Multimedia Subsystem) enables an operator, i.e. a service provider, to deliver multimedia services based on IP (Internet Protocol) transport in a secure way, independently of the access technology and of the type of user terminal. A conventional IMS architecture includes three main layers, typically referred to as an access layer, an IMS layer (or a session setup/control layer), and a service layer. The core network, which comprises an HSS (Home Subscriber Server) and a CSCF (Call Session Control Function), can be connected to several different access networks, both cellular and wire-lined, and the PSTN (Public Switched Telephony Network) is normally accessibly via a MGW (Media Gateway) and a MGCF (Media Gateway Control Function).

The SIP (Session Initiation Protocol) is the main signalling protocol for handling a packet switched session in the IMS, and the CSCF processes the SIP signalling and provides session control and interaction with the HSS. The functions of the CSCF can be divided into a Serving Call Session Control, S-CSCF, an Interrogating Call Session Control, I-CSCF and a Proxy Call Session Control, P-CSCF.

The session- and the user management take place in the IMS core network, which comprises the HSS and the CSCFs, of which the CSCFs are managing the sessions between users and services, and the HSS contains subscription-related information and location information and performs authentication and authorization of the users. Further, a border gateway of the IMS network typically acts as a SIP firewall, allowing only secure flows. This border gateway node may be denoted e.g. a Session Border Gateway, SBG, a Session Border Controller, SBC, or a Border Gateway function. Hereinafter, the generic term "border gateway" will be used, and the abbreviation SBG (Session Border Gateway) will be used in the drawings.

The specification "SIPconnect 1.1 Technical Recommendation" specifies a profile of the Session Initiation Protocol, SIP, for handling the connectivity between a SIP-enabled Service Provider Network and a SIP-enabled Enterprise Network. Said SIP Connect-specification describes two modes of operation, i.e. the Registration mode and the Static mode, which differ in the way the Service Provider Network discovers the SIP signalling address of a telephone exchange, i.e. a private branch exchange serving a particular company/enterprise. Such a private branch exchange may be denoted e.g. a PBX (Private Branch Exchange) or a PABX (Private Automated Branch Exchange). Hereinafter, the generic term "private branch exchange" or the abbreviated term PBX will be used. Further, the telephone lines between the operator and a private branch exchange are typically denoted trunk lines, or simply a PBX trunk.

In the Registration mode of the SIP Connect, also referred to as the Dynamic node, a private branch exchange, PBX, registers with the service provider's network using a Register requesting message including a specifically formatted Contact URI, followed by an authentication procedure using the SIP Digest. When the PBX is authenticated by the service provider's network, a DNS (Domain Name System) is dynamically updated with each SIP signalling address associated with the PBX, thereby connecting the PBX trunk to the network of the service provider.

In the Static mode of the SIP Connect, the service provider's network is either pre-configured with the (static) signalling addresses associated with the private branch exchange, or obtains the addresses from a DNS-server.

Conventionally, a PBX is connected to an IMS network of a service provider using e.g. the ISDN (Integrated Services Digital Network). However, since the ISDN may not be available in the near future, it is desirable that the PBX can connect to an IMS network using the above-described standardized SIP Connect, instead of the ISDN. However, at present this is not possible, since the IMS does not support SIP Connect, and consequently a service provider is not able to connect a PBX trunk to an IMS network using the SIP Connect.

SUMMARY

It is an object of the embodiments described hereinafter to address at least some of the issues outlined above, and this object and others are achieved by the method and the arrangement according to the appended independent claims, and by the embodiments according to the dependent claims.

A first aspect of exemplary embodiments provides a method for a border gateway of an IMS network of connecting a private branch exchange to the IMS network, the IMS network comprising a SIP Application Server. The method comprises the border gateway receiving a SIP register message from the private branch exchange, and the message comprises an address associated with the private branch exchange. If the border gateway detects, based on the address, that the SIP register message is received from a private branch exchange, the border gateway forwards the received message to the SIP Application Server as a SIP connect-message from a private branch exchange, enabling a storing of a binding between an IP address of the private branch exchange and the received address associated with the private branch exchange.

The border gateway may observe the IP address of the private branch exchange in the received SIP register message, and forward the IP address to the SIP Application Server.

The storing of the binding between the IP address of the private branch exchange and the address associated with the private branch exchange may comprise a dynamic update of an external DNS-server, and the detecting may comprise the border gateway comparing the address contained in the received message with a stored listing of addresses to private branch exchanges.

A second aspect of exemplary embodiments provides a method for a SIP Application Server of connecting a private branch exchange to an IMS network, the IMS network comprising a border gateway. The method comprises the SIP Application Server receiving a SIP connect-message forwarded from the border gateway. This message originates in a SIP register message received by the border gateway from a private branch exchange, and comprises an address associated with the private branch exchange. When receiving the message, the SIP Application server stores a binding between an IP address of the private branch exchange and the address associated with the private branch exchange.

Further, the SIP Application Server may receive the IP address of the private branch exchange from the border gateway.

The storing of the binding between the IP address of the private branch exchange and the address associated with the private branch exchange may comprise a dynamic update of an external DNS-server.

The SIP Application Server may also update an internal DNS-server in the IMS network dynamically, e.g. by storing a binding between an IP-address of the SIP Application server and the address associated with the private branch exchange, or a binding between an IP-address of the border gateway and the address associated with the private branch exchange.

A third aspect of exemplary embodiments provides a border gateway for an IMS network, the IMS network further comprising a SIP Application server. The border gateway is arranged to connect a private branch exchange to the IMS network, and comprises a Receiver configured to receive a SIP Register message from the private branch exchange, the message comprising an address associated with the private branch exchange, and a Processing circuitry configured to detect, based on the received address, that the SIP Register message is received from a private branch exchange. The border gateway also comprises a Transmitter configured to forward the received message to a SIP Application Server as a SIP Connect message from a private branch exchange, enabling a storing of a binding between an IP address of the private branch exchange and the address associated with the private branch exchange.

The Processing circuitry may also be configured to observe the IP address of the private branch exchange in the received SIP register message, and the Transmitter may be configured to forward the IP address to the SIP application server.

Further, the Processing circuitry may be configured to determine that a received SIP Register message is received from a private branch exchange by comparing an address comprised in the message with a stored listing of addresses to private branch exchanges.

A fourth aspect of exemplary embodiments provides a SIP Application Server for an IMS network, the IMS network further comprising a border gateway. The SIP Application Server is arranged to connect a private branch exchange to the IMS network, and comprises a Receiver configured to receive a SIP connect message forwarded from the border gateway. The message originates in a SIP register message received by the border gateway from a private branch exchange, and comprises an address associated with the private branch exchange. The SIP Application Server also comprises a Processing circuitry configured to store a binding between an IP address of the private branch exchange and the address associated with the private branch exchange.

The Receiver may be further configured to receive the IP address of the private branch exchange from the border gateway.

The SIP Application Server may also be configured to invoke at least one other available standard SIP Application Server or IMS Application Server.

It is an advantage with exemplary embodiments to enable a service provider to use the standardized SIP Connect for connecting a private branch exchange, PBX, to an IMS network. The embodiments support a basic Network-to-Network Interface-level connection between a PBX and an IMS network, with only minor modifications and configuration changes in an existing border gateway and in an existing SIP Application Server of an IMS network.

BRIEF DESCRIPTION OF THE DRAWINGS

Exemplary embodiments of the invention will now be described in more detail, and with reference to the accompanying drawings, in which.

DETAILED DESCRIPTION

In the following description, the invention will be described in more detail with reference to certain embodiments and to accompanying drawings. For purposes of explanation and not limitation, specific details are set forth, such as particular scenarios and techniques in order to provide a thorough understanding. However, it is apparent to one skilled in the art that the invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of methods and devices, they may also be embodied in a computer program product as well as in a system comprising a computer processor and a memory coupled to the processor, wherein the memory is encoded with one or more programs that may perform the functions disclosed herein.

The embodiments described hereinafter discloses a modified SIP Application Server and a modified border gateway, which both are configured to enable a standard IMS core to support the Registration mode (i.e. the Dynamic mode) of the standardized SIP Connect. According to exemplary embodiments, the border gateway is able to detect when an incoming SIP Register requesting message is received from a PBX, the detection being based on an address associated with the PBX and contained in the SIP Register, e.g. by the border gateway comparing the address with a listing of PBX addresses. This address should include the telephone number of the PBX, but not the IP address. When a SIP Register requesting message from a PBX is detected by the border gateway, the border gateway will relay the SIP Register message towards the SIP application server as a SIP Connect message, without a conventional application-level handling of the SIP Register request, wherein the SIP Application Server is able to adapt a message received from the PBX to be IMS compliant.

According to exemplary embodiments, the address that is contained in the SIP Register requesting message received by the border gateway from the PBX is a specific "trunk" address assigned to the PBX, having e.g. a following format:
+46703053287@comp1.pbxtrunk.telia.com/
pbxl@comp1.pbxtrunk.telia.com.

A part of this address, typically "comp1.pbxtrunk.telia.com", corresponds to a DNS address for this specific PBX, as stored in a DNS-server, and is thus associated with the PBX. According to exemplary embodiments, the SIP Application Server will request a conventional authentication of the PBX, when receiving a SIP Connect message relayed from a border gateway, wherein the SIP Connect message originates in a SIP Register requesting message issued by the PBX. After a successful authentication, the SIP Application Server will store a binding between an IP address of the PBX performing the registration and the address that is associated with the PBX, i.e. a part of the address included in the SIP Register message, for example comp1.pbxtrunk.telia.com, as explained above. According to a further exemplary embodiment, the binding may correspond to a dynamic update of an external DNS-server, involving storing the IP address of the PBX with an association (binding) to the DNS address (or host address) of the PBX that is stored in the external DNS-server, the DNS address of the PBX corresponding to an address received in the SIP Register from the PBX. The SIP Application Server may also store auxiliary information received from the PBX for the translation between IMS-compliant SIP messages and non-IMS compliant SIP messages.

According to an embodiment, the border gateway observes the IP address of the PBX, and typically also the port number of the PBX, in a received SIP Register-message as a "remote" IP address. Before forwarding the message as a SIP Connect message to the SIP Application Server, the border gateway adds the observed IP address and the port number to a "via" header appended by the PBX. Since the "via" header is visible to the SIP Application Server receiving the SIP Connect-message, the SIP Application Server is able to obtain the IP address from the "via" header. Alternatively, the IP address of the PBX may be forwarded from the border gateway to the SIP Application Server as a proprietary addition to the communication.

According to a further embodiment, the SIP Application Server will also store a binding between an IP address of the SIP Application Server itself, and the address associated with the PBX. This binding is typically stored internally in the IMS network, and may correspond to a dynamic update of an internal DNS-server, involving storing the IP address of the SIP Application Server with an association (binding) to the DNS address of the PBX that is stored in the internal DNS-server. This optional internal DNS update enables a scaling e.g. based on round robin DNS or an external load balancer.

Alternatively, in case the PBX does not require any services, or in case the serviced could be handled directly by the border gateway, a binding is stored internally in the IMS network between an IP address of the border gateway and the address associated with the PBX, such that the IP address of the border gateway is stored in an internal DNS server with an association (binding) to the DNS-address of the PBX that is stored in the internal DNS server. The IP address of the border gateway is received by the SIP Application server e.g. in the "via" header appended to the SIP Connect message by the border gateway, before forwarding the message to the SIP Application server.

Further, the SIP Application server may perform ordinary business trunk functions, such as e.g. Call Admission Control and Emergency Location generation.

According to a further embodiment, the SIP Application Server is configured to be able to invoke other available standard SIP Application Servers and/or IMS Application Servers.

Figure 1:
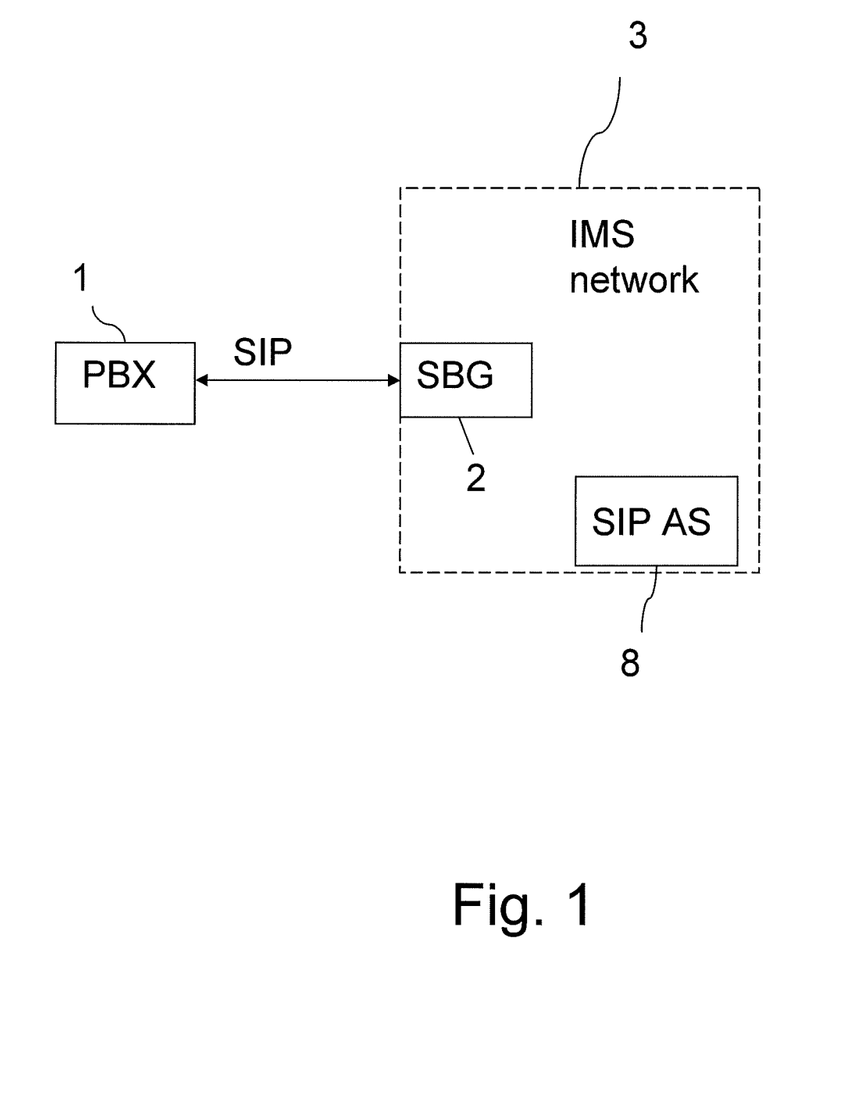
FIG. 1 schematically illustrates an exemplary IMS network of a Service Provider, in which the PBX is connected to the IMS network using SIP Connect.

FIG. 1 illustrates an IMS network 3 of a service provider, the IMS network comprising a SIP Application Server 8 and a border gateway 2. The border gateway (SBG) 2 communicates with a signaling entity of a PBX 1, wherein the PBX and the SBG of the IMS network is connected using the standardized SIP Connect, according to exemplary embodiments described herein.

Figure 2:
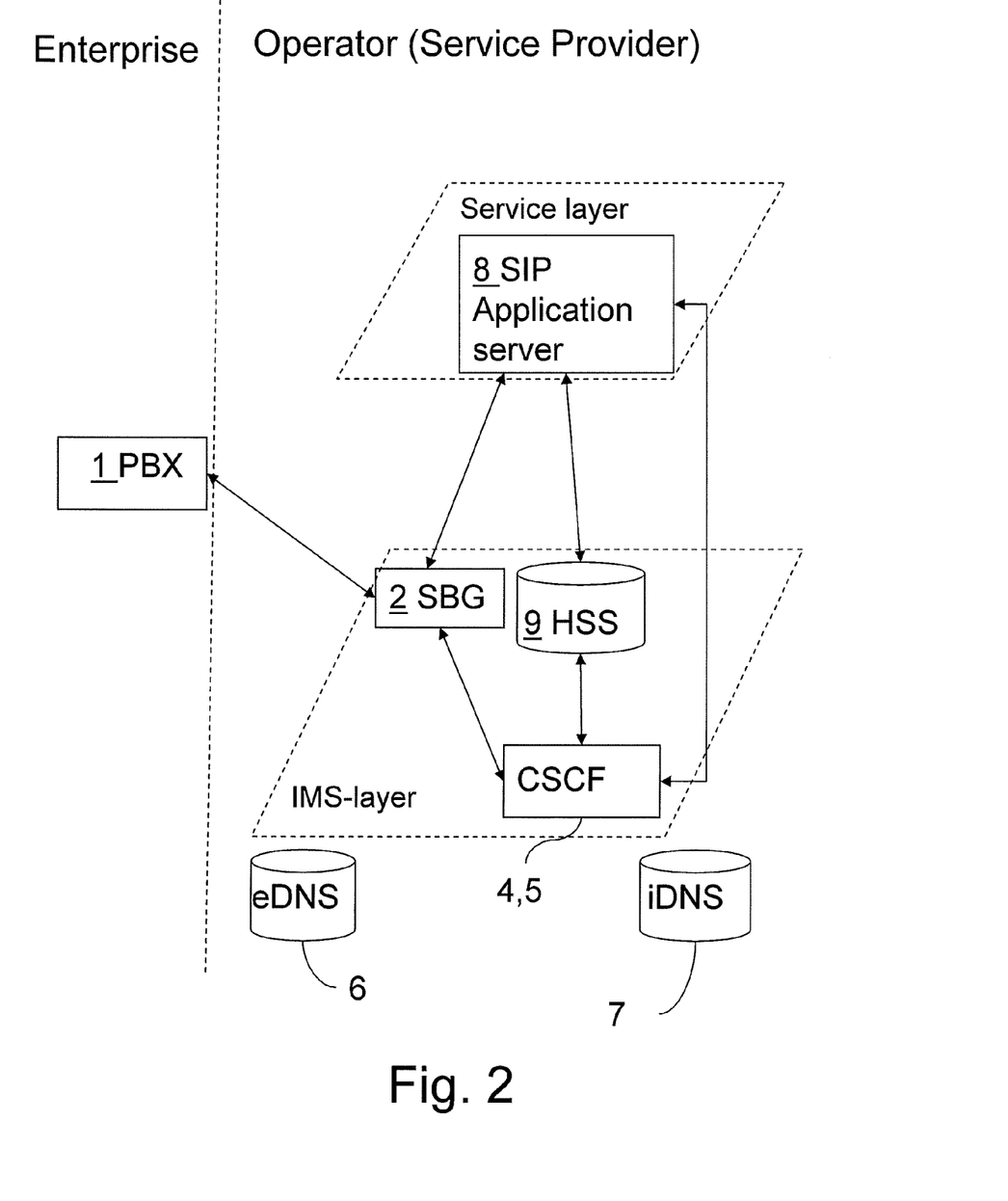
FIG. 2 illustrates an exemplary architecture of a PBX connected to an IMS network of a service provider.

FIG. 2 illustrates an exemplary architecture for a PBX 1, located at an enterprise, connected to an IMS network 3 of a Service Provider (telephony operator). However, the access, e.g. Internet access, is provided by an Internet operator (not illustrated in FIG. 2) that may be a different operator than the telephony operator. Two layers of the IMS network are illustrated in the figure, i.e. an exemplary service layer comprising a SIP Application server 8, and an exemplary IMS-layer comprising an HSS 9, CSCFs 4, 5, and an SBG 2. The architecture also illustrates an external DNS-server 6, and an internal DNS-server 7 of the IMS network, in which previously stored DNS-addresses (or host addresses) of devices may be dynamically updated with a binding to the current IP addresses of the devices.

However, according to an exemplary embodiment that is not illustrated in FIG. 2, the SIP Application Server 8 is co-located with the border gateway 2.

Figure 3:
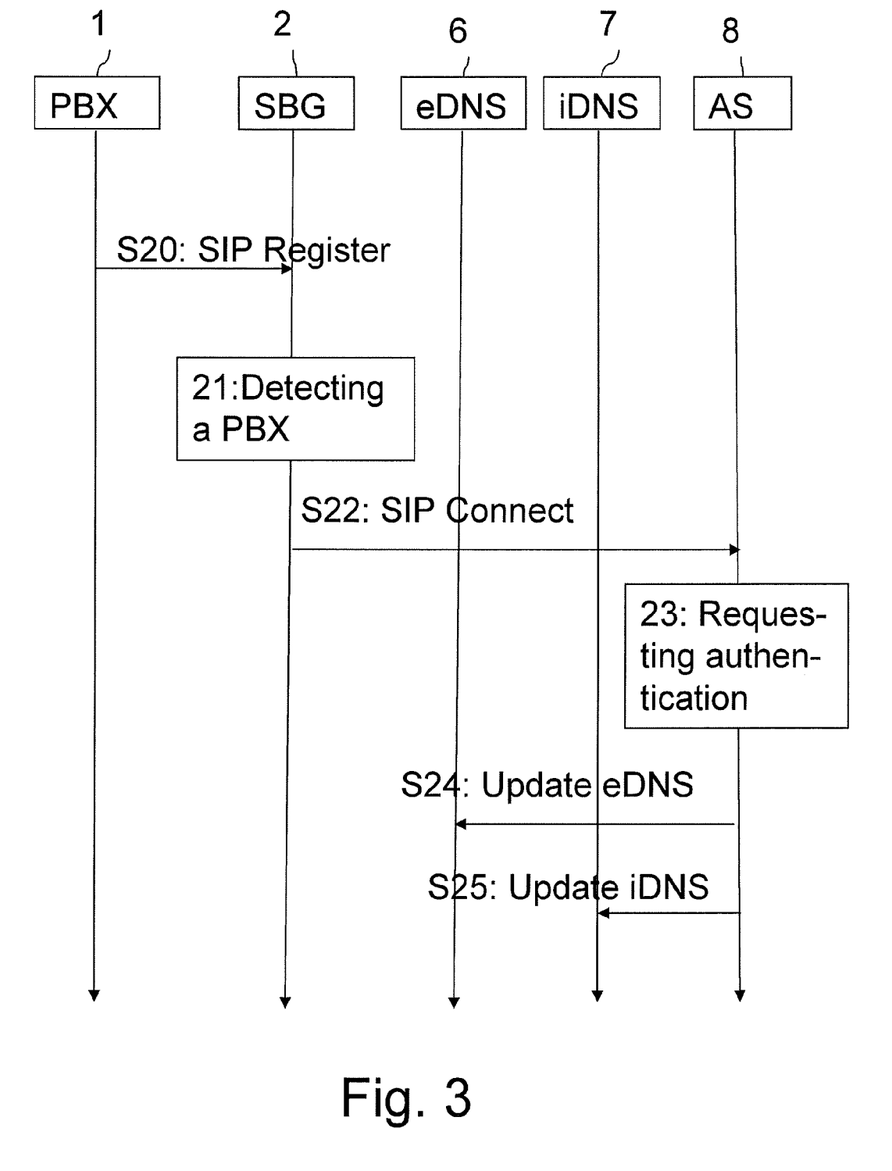
FIG. 3 is an exemplary signalling diagram illustrating a PBX connecting to an IMS network, involving a SIP Connect.

FIG. 3 is a signalling diagram illustrating an exemplary embodiment of connecting the PBX 1 to the IMS network illustrated in FIG. 2, using the SIP Connect.

In signal S20 FIG. 3, the border gateway (SBG) 2 of the IMS network receives a SIP Register requesting message from the PBX 1, the message containing a specific PBX trunk address associated with the PBX. When the SBG receives the SIP Register, it determines whether the SIP Register is received from a PBX or not, based on the address contained in the SIP Register request, e.g. by comparing the address with a listing of PBX addresses.

If a PBX trunk is detected, in step 21, the SBG relays the SIP Register request as a SIP Connect requesting message to the SIP AS 8, which requests a standard authentication of the PBX, in step 23. If the authentication is successful, the SIP AS updates an external DNS-server 6 with a binding between the address associated with the PBX, as included in the received SIP Connect, and the IP address of the PBX, in signal S24. The IP address of the PBX has been observed by the SBG, and forwarded to the SIP AS, e.g. in a "via" header in the message. In signal S25, an internal DNS-server 7 is updated with a binding between the address associated with the PBX and the IP address of the SIP Application Server, or with a binding between the address associated with the PBX and the IP address of the SBG. However, the signal S25 is optional.

Figure 4:
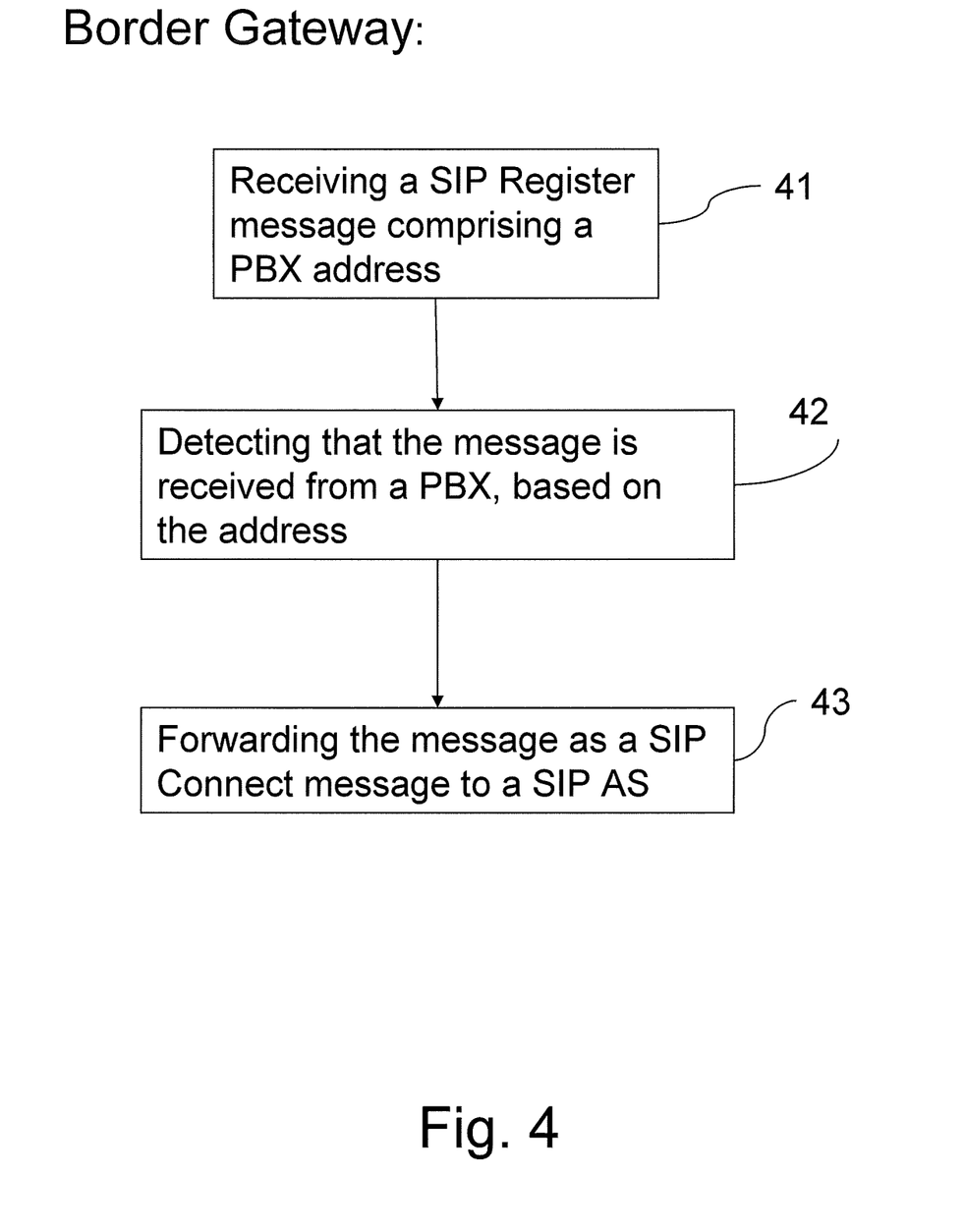
FIG. 4 is a flow diagram schematically illustrating an exemplary method for a border gateway.

FIG. 4 is a flow diagram illustrating an exemplary embodiment of a method for a border gateway 2 in an IMS network of connecting a PBX to the IMS network. First, the border gateway receives a SIP Register requesting message in step 41, the message including an address associated with the PBX. If the border gateway detects, in step 42, that the message is received from a PBX, the border gateway forwards, in step 43, the message as a SIP Connect message to the SIP Application Server 8. The detection is based on the received address, e.g. by the border gateway comparing the received address with a listing of PBX trunk addresses. When the SIP Application Server 8 receives the SIP Connect message forwarded by the border gateway, the SIP Application server is able to store a binding between the IP address of the PBX, as forwarded by the border gateway, and the address associated with the PBX, which is stored e.g. in an external DNS-server 6.

Figure 5:
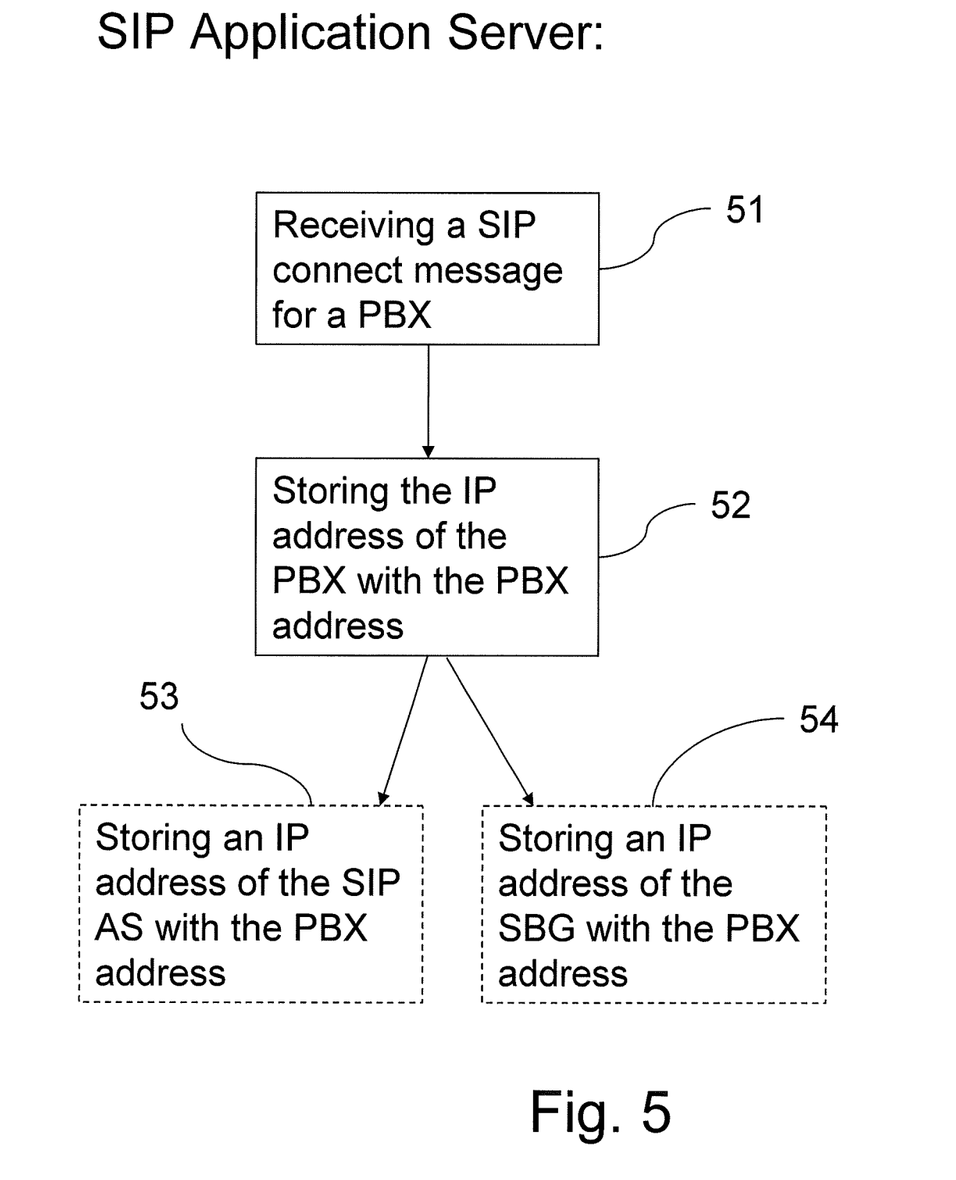
FIG. 5 is a flow diagram schematically illustrating an exemplary method for a SIP Application server.

FIG. 5 is a flow diagram illustrating an exemplary embodiment of a method for an SIP Application Server 8, in which the SIP Application server receives a SIP Connect message from the border gateway 2, in step 51, the message including an address associated with the PBX. Upon receiving this SIP Connect message, the SIP AS stores a binding between the IP address of the PBX, which has been received from the border gateway e.g. in a "via" header, and the received address of the PBX, e.g. in an external DNS-server 6.

Optionally, the SIP Application Server, in step 53, stores a binding internally in the IMS network, e.g. in an internal DNS-server 7, between the IP address of the SIP Application Server and the received PBX address, or, alternatively, between the IP address of the border gateway and the received PBX address, in step 54.

Figure 6A:
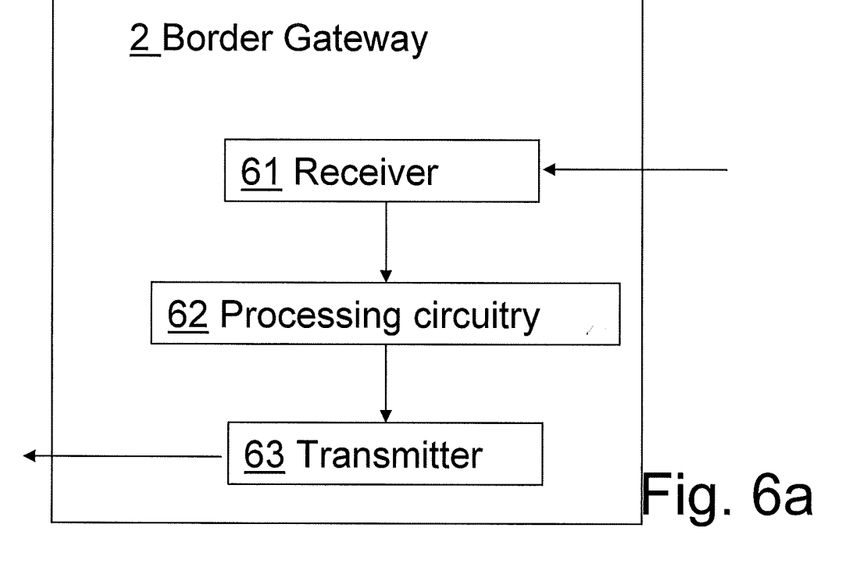
FIGS. 6a and 6b schematically illustrate an exemplary border gateway.

FIG. 6a schematically illustrates an exemplary Border Gateway 2, e.g. an SBG, connectable to an IMS network 3, the Border Gateway comprising suitable communication means for communicating with a PBX 1 of an enterprise, as well as with a SIP Application Server 8 and the CSCFs of the IMS network, the communication means including a Receiver 61 and a Transmitter 63, as well as appropriate Processing circuitry 62.

In an exemplary embodiment, the Receiver 61 in the border gateway is configured to receive a SIP Register message from the private branch exchange, the message comprising an address associated with the private branch exchange. The Processing circuitry 62 is configured to detect, based on the received address, when a received SIP Register message is received from a private branch exchange, e.g. by comparing the address with a listing of PBX addresses, and the Transmitter 63 is configured to forward the received message to a SIP Application Server as a SIP Connect message from a private branch exchange, in case the SIP Register message is received from a PBX.

According to a further exemplary embodiment of the border gateway, the Processing circuitry 62 is configured to observe the IP address of the private branch exchange as a "remote" IP address in the received SIP register message, and the Transmitter 63 is configured to forward the IP address to the SIP application server, e.g. added to a "via" header that is visible to the SIP Application Server.

Figure 6B:
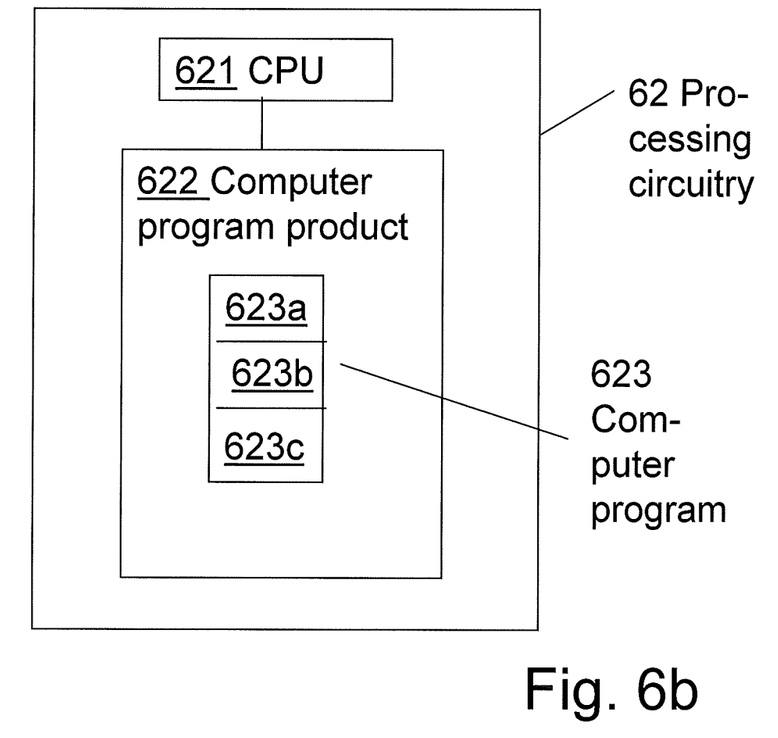

FIG. 6b illustrates schematically the Processing circuitry 62 of FIG. 6a, the circuitry comprises a CPU 621, which may be a single unit or a plurality of units. Furthermore, the Processing circuitry comprises at least one computer program product 622 in the form of a non-volatile memory, e.g. an EEPROM (Electrically Erasable Programmable Read-Only Memory), a flash memory or a disk drive. A computer program 623 is stored on the computer program product, the computer program comprising code means which when run on the Border Gateway causes the CPU 621 to perform the steps of the procedures described earlier in conjunction with FIG. 4.

Hence, in the exemplary embodiment illustrated in FIG. 6b, the code means in the computer program 623 comprises a receiving module 623a, a detecting module 623b and a forwarding module 623c. The modules 623a-623c essentially perform the steps of the flow in FIG. 4 to emulate the Border Gateway described in connection with FIG. 6a. However, one or more of the modules of the code means may in alternative embodiments be implemented at least partly as hardware circuits, particularly the receiving module and the forwarding module.

Figure 7A:
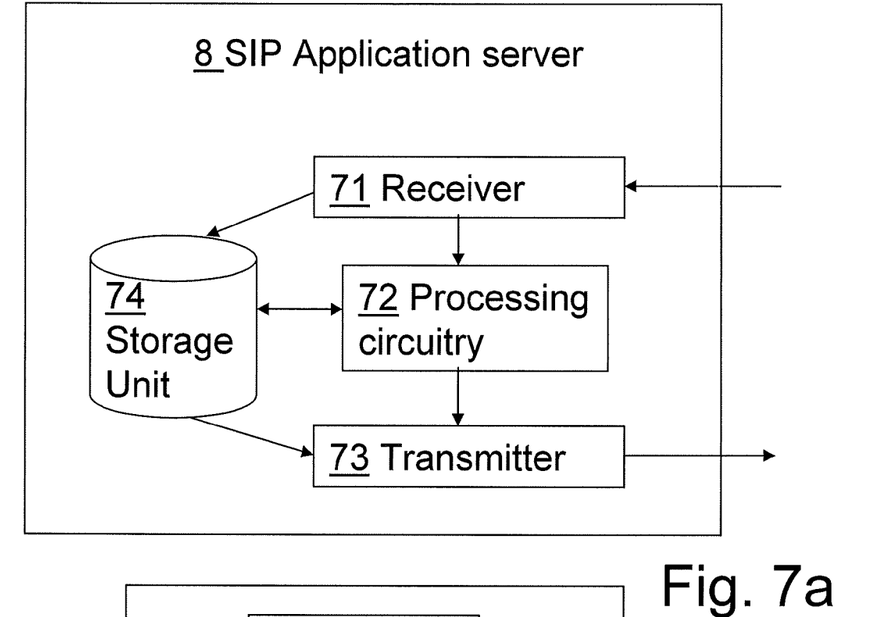
FIGS. 7a and 7b schematically illustrate an exemplary SIP Application server.

FIG. 7a schematically illustrates an exemplary SIP Application server 8 that is connectable to an IMS network, the SIP AS comprising suitable communication means for communicating with a border gateway 2 of the IMS network, as well as with a HSS 9 and the CSCFs 4, 5, the communication means including a Receiver 71 and a Transmitter 73, the SIP AS also comprising a storage unit 74 and processing circuitry 72.

The Receiver 71 of the SIP AS is configured to receive a SIP Connect message forwarded from the border gateway, wherein the message originates in a SIP register message received by the border gateway 2 from a private branch exchange 1. The message comprises an address that is associated with the private branch exchange, and the Processing circuitry 72 is configured to store a binding between an IP address of the private branch exchange and the received address of the private branch exchange.

According to an exemplary embodiment, the IP Address of the private branch exchange is received in a "via" header contained in the SIP Connect-message received from the border gateway, wherein the "via" header is visible to the SIP AS.

According to another exemplary embodiment, the storing of the binding between the IP address of the private branch exchange and the address associated with the private branch exchange corresponds to a dynamic update of an external Domain Name System, eDNS, server 6.

Further, according to another embodiment, the Processing circuitry 72 of the SIP AS is further configured to dynamically update an internal Domain Name System, iDNS, server 7 of the IMS network, e.g. by a binding between an IP-address of the SIP Application server and the address associated with the private branch exchange, or by a binding between an IP-address of the border gateway and the address associated with the private branch exchange.

Figure 7B:
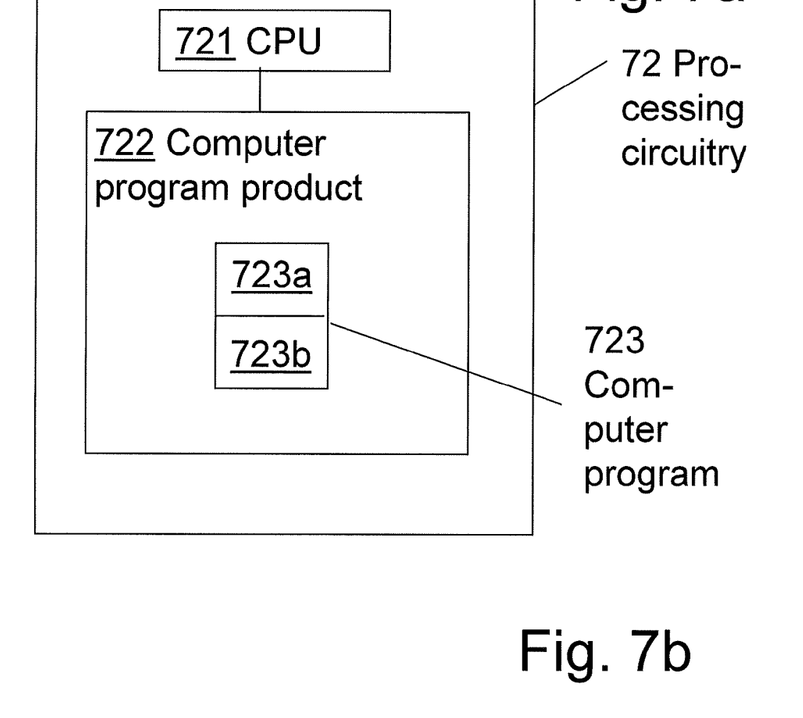

FIG. 7b illustrates schematically processing circuitry 72 of FIG. 7a, the processing circuitry comprising a CPU 721, which may be a single unit or a plurality of units. Furthermore, the processing circuitry comprises at least one computer program product 722 in the form of a non-volatile memory, e.g. an EEPROM (Electrically Erasable Programmable Read-Only Memory), a flash memory or a disk drive. The computer program product 722 comprises a computer program 723, which comprises code means which when run on the SIP AS causes the CPU 721 to perform the steps of the procedures described earlier in conjunction with FIG. 5.

Hence, in the embodiment illustrated in FIG. 7b, the code means in the computer program 723 comprises a receiving module 723a and a storing module 723b, wherein the modules essentially perform the steps of the flow in FIG. 5 to emulate the SIP AS described in connection with FIG. 7a. However, one or more of the modules of the code means may in alternative embodiments be implemented at least partly as hardware circuits.

Thus, it should be noted that the above-described border gateway 2 and SIP Application server 8 could be implemented by physical or logical entities using software functioning in conjunction with a programmed microprocessor or general purpose computer, and/or using an application specific integrated circuit (ASIC). They may further comprise additional internal and external storage devices, as well as appropriate communication interfaces, including hardware and software capable of performing the necessary modulating, coding, filtering and the like, as well as demodulating and decoding to process such signals.

However, the above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A border gateway comprising a Session Initiation Protocol (SIP) application server for an Internet Protocol Multimedia Sub-system (IMS) network, wherein the border gateway is arranged to connect a private branch exchange to the IMS network, the border gateway comprising:
 a first receiver configured to receive a SIP Register message from the private branch exchange, the SIP Register message comprising an address associated with the private branch exchange;
 a first processing circuitry configured to detect that the SIP Register message is received from the private branch exchange by comparing the address comprised in the received SIP Register message with a listing of addresses of a plurality of private branch exchanges stored in the border gateway, wherein the address comprised in the received SIP Register message is a domain name system address of the private branch exchange; and
 a transmitter configured to forward the received SIP Register message to the SIP application Server as a SIP Connect message from a private branch exchange;
wherein the SIP application server comprises:
 a second receiver configured to receive the SIP Connect message forwarded from the border gateway, the SIP Connect message comprising the address associated with the private branch exchange, and
 a second processing circuitry configured to dynamically update an external Domain Name System (eDNS) to store a binding between an IP address of the private branch exchange and the address associated with the private branch exchange comprised in the received SIP Connect message forwarded from the border gateway,
 the second processing circuitry further configured to dynamically update an internal Domain Name System (iDNS) of the IMS network after dynamically updating the eDNS.

2. The border gateway according to claim 1, wherein the first processing circuitry is configured to observe the IP address of the private branch exchange from the received SIP Register message, and the transmitter is configured to forward the IP address to the SIP application server.

3. The border gateway according to claim 1, wherein the second receiver of the SIP application server is configured to receive the IP address of the private branch exchange from the border gateway.

4. The border gateway according to claim 1, wherein the updating of the iDNS comprises storing a binding between an IP-address of the SIP application server and the address associated with the private branch exchange.

5. The border gateway according to claim 1, wherein the updating of the iDNS comprises storing a binding between an IP-address of the border gateway and the address associated with the private branch exchange.

6. The border gateway according to claim 1, wherein the SIP application server is configured to invoke at least one other available standard SIP application server or IMS application server.

* * * * *